United States Patent Office 3,576,884
Patented Apr. 27, 1971

3,576,884
PROCESS FOR PREPARING VINYL ETHERS
James P. Russell, Berkeley Heights, N.J., assignor to Air Reduction Company, Incorporated, New York, N.Y.
No Drawing. Continuation of application Ser. No. 649,848, June 29, 1967. This application Nov. 7, 1969, Ser. No. 871,604
Int. Cl. C07c 41/10
U.S. Cl. 260—611                    5 Claims

ABSTRACT OF THE DISCLOSURE

Vinyl ethers are prepared from sensitive higher alcohols by reacting such alcohols with lower alkyl vinyl ethers in contact with a mercury-amine catalyst.

This application is a continuation of application Ser. No. 649,848 filed June 29, 1967 and now abandoned.

This invention pertains to a process for preparing vinyl ethers, particularly vinyl ethers of heat-, acid- and base-sensitive alcohols by transetherification with other vinyl ethers.

It has been proposed that vinyl alkyl ethers in which the alkyl group is primary be reacted with primary or secondary monohydric alcohols in the presence of a basic acetal-splitting catalyst such as alkaline-reacting diatomaceous earth. This process, however, is confined to relatively few vinyl ethers and alcohols and gives mixtures of ethers. It cannot be applied to materials which are sensitive to basic conditions and, since it requires temperatures of 250–450° C., it cannot be applied to heat-sensitive materials.

It has also been proposed to transetherify vinyl ethers at temperatures between 0° and about 150° C. in the presence of mercury salts of carboxylic acids, which salts are soluble in the reaction mixture and are formed with acids having a $pK_a$ value in water in the range of 4 to 7, particularly mercuric acetate. However, since acetic acid can be removed from mercuric acetate as the temperature of the reaction mixture is raised above about 100° C. it was proposed to use mercury salts of such acids as benzoic, methoxyacetic, 2-ethylbutyric, and like acids which react with mercury only to form salts. Also, in an effort to compensate for the loss of acetic acid at temperatures above 100° C. when mercuric acetate is used as the catalyst, it has been proposed to add a carboxylic acid higher boiling than acetic acid which yields mercury compounds soluble in the reaction mixture. A problem with such processes has been that when lower vinyl ethers are converted to higher vinyl ethers using labile alcohols there is a substantial formation of acetals.

It is the object of this invention to provide a new and improved method for preparing higher vinyl ethers by transetherifying other vinyl ethers.

It is a further object of this invention to provide a new and improved method for preparing higher vinyl ethers by transetherifying other vinyl ethers with higher alcohols which are heat-, acid- or base-sensitive.

These and other objects will appear more clearly from the detailed specification which follows.

It has now been found that higher vinyl ethers can be prepared in 90 to 100% yields by transetherifying lower alkyl vinyl ethers, which form azeotropes with their parent alcohols, with higher alcohols which are heat- acid- or base-sensitive under mild conditions in contact with a mercury-amine catalyst. Under the mild conditions applied, the parent alcohol of the lower vinyl ether is formed and removed overhead as the azeotrope with the lower alkyl vinyl ether. The lower vinyl ether is used in excess and fresh lower alkyl vinyl ether may be added to the reaction mixture to replace that taken overhead in the distillate. The reaction is continued until the distillate formed is substantially free of the parent alcohol of the lower alkyl vinyl ether, thereby forcing the reaction to completion and preventing the formation of acetals from the ethers and alcohols.

The lower alkyl vinyl ethers which can be used in accordance with the present invention have 3 to 6 carbon atoms in the lower alkyl group and form azeotropes with their parent alcohols and include propyl vinyl ether, isopropyl vinyl ether, normal butyl vinyl ether, isobutyl vinyl ether, sec. butyl vinyl ether and tert. butyl vinyl ether, n-amyl vinyl ether, n-hexyl vinyl ether and other C–5 and C–6 alkyl vinyl ethers, cyclopentyl vinyl ether, and cyclohexyl vinyl ether. The maximum boiling point of the azeotrope suitably is less than 120° C.

Heat-, acid- or base-sensitive alcohols (herein referred to as labile higher alcohols) that may be transetherified with the lower alkyl vinyl ethers include saturated and unsaturated alcohols such as: phenylethanol, diethylene glycol, saturated tertiary alcohols of 5–25 carbon atoms, hydroxy esters of 5–25 carbon atoms, hydroxy ketones of 5–25 carbon atoms, sugars of 5–25 carbon atoms, borneol, diethanolamine, triethanolamine, cholesterol and other sterols, cinnamic alcohol, citronellol, menthols, eugenol, linalool, rhodinol, phytol, terpinol, further including alcohols which have a tendency to rearrange such as geraniol and nerol, and acetylenic alcohols such as: methyl butynol, methyl nonynol, hexynol, ethynyl cyclohexanol, phenyl butynol, propynol, di methyl hexyndiol, tetramethyl decyndiol, tetraphenyl butylndiol.

While various mercury compounds can be used as catalyst, the present process permits the use of mercuric acetate without incurring any loss of acetic acid or requiring the use of other carboxylic acids to compensate for the loss of acetic acid. The amount of mercury compound, preferably mercuric acetate, used may vary from about 0.10 to 10%, preferably about 1% by weight of the labile higher alcohol.

The high molecular weight amines utilized in conjunction with the mercury compound as catalyst for the transetherification reaction are such secondary or tertiary amines having a molecular weight of 125 to 500, preferably 125 to 300, such as N,N'-diphenyl-p-phenylenediamine, phenyl and naphthylamine, diphenylamine, and the like. The amount of such amines may vary from 0.1 to 10% by weight of the labile higher alcohol.

The amount of lower alkyl vinyl ether used in accordance with the present invention is in excess of the labile higher alcohol and may be in the range of 1.1 to 20 moles, preferably about 10 moles per mole of the higher alcohol. The reaction is carried out at temperatures of from about 60 to 120° C., preferably 75 to 110° C. The amount of lower alkyl vinyl ether in the reaction mixture can be maintained at the desired level by continuous or intermittent addition thereof to compensate for that removed as distillate during the reaction. The reaction is continued until the distillate is free of the parent alcohol of the lower alkyl vinyl ether, thereby forcing the reaction to completion to obtain as high as 90 to 100% conversion of the labile higher alcohols to the corresponding vinyl ether.

The following examples are illustrative of the present invention.

EXAMPLE I 1.0 mole of phenylethanol, 12.0 g. of mercuric acetate, 3.0 g. N,N'-diphenyl-p-phenylenediamine and 1000 g. of isobutyl vinyl ether were mixed in the still pot of a high platage ntill. After refluxing for 1 hr. isobutyl vinyl ether-isobutanol azeotrope (6% isobutanol) was taken off overhead while fresh isobutyl vinyl ether was added continuously to the pot to replace that removed in the distillage. After 1400 to 1600 cc. of azeotrope had been taken overhead the isobutanol content of the distillate dropped to zero. The remaining isobutyl vinyl ether was taken overhead under vacuum to a temperature of 60° C./30 mm. The residue was then transferred to a 5 plate vacuum still and fractionated giving 140 g. phenylethyl vinyl ether B.P. 62° C./2.0 mm. (94.5% yield).

EXAMPLE II

The procedure of Example I was repeated using 154 g. of a geraniol-nerol mixture (60% geraniol 40% nerol) instead of the phenylethanol. There was obtained 162 g. of a geranyl vinyl etherneryl vinyl ether mixture having the same distribution of geraniol to nerol groupings as the geraniol-nerol mixture charged. The product mixture had a boiling point of 74° C./2.0 mm.

The above examples show that lower alkyl vinyl ethers can be converted to higher vinyl ethers in high yields by transetherification with labile higher alcohols in contact with mercury compound-high molecular amine catalysts. It will be understood, however, that this invention is not limited to these specific examples since numerous variations will be apparent to those skilled in this art without departing from the scope of the following claims.

I claim:
1. A method for preparing higher vinyl ethers which comprises reacting at a temperature of about 100° to about 120° C. a lower alkyl vinyl ether containing 3 to 6 carbon atoms in the alkyl group which forms an azeotrope with its parent alcohol with phenyl ethanol or a geraniol-nerol mixture and in contact with a mercuric acetate-high molecular weight amine catalyst wherein said amine is an aromatic hydrocarbon secondary or tertiary amine having a molecular weight of 125 to 500.

2. A method for preparing higher vinyl ethers which comprises reacting at a temperature of about 100° to about 120° C. a lower alkyl vinyl ether containing 3 to 6 carbon atoms in the alkyl group which forms an azeotrope with its parent alcohol with phenyl ethanol or a geraniol-nerol mixture and in contact with a mercuric acetate-high molecular weight amine catalyst wherein said amine is an aromatic hydrocarbon secondary or tertiary amine having a molecular weight of 125 to 500 in a distillation reactor, removing the lower alkyl vinyl ether-parent alcohol azeotrope as distillate, adding fresh lower alkyl vinyl ether to the reaction mixture to replace that taken overhead as distillate, continuing the reaction until the distillate is substantially free of the parent alcohol, and separating the higher vinyl ether formed from the remaining lower alkyl vinyl ether.

3. The process as defined in claim 2 in which the amine is N,N'-diphenyl-p-phenylenediamine.

4. A method for preparing higher vinyl ethers which comprises reacting at a temperature of about 100° to about 120° C. isobutyl vinyl ether and phenyl ethanol in contact with a mercuric acetate-N,N'-diphenyl-p-phenylenediamine catalyst in a distillation reactor, removing an isobutyl vinyl ether-isobutanol azeotrope as distillate, adding fresh isobutyl vinyl ether to the reaction mixture to replace that taken overhead as distillate, continuing the reaction until the distillate is substantially free of isobutanol, and separating the vinyl ether formed from the remaining isobutyl vinyl ether.

5. A method for preparing higher vinyl ethers which comprises reacting at a temperature of about 100° to about 120° C. isobutyl vinyl ether and a geraniol-nerol mixture in contact with a mercuric acetate-N,N'-diphenyl-p-phenylenediamine catalyst in a distillation reactor, removing an isobutyl vinyl ether-isobutanol azeotrope as distillate, adding fresh isobutyl vinyl ether to the reaction mixture to replace that taken overhead as distillate, continuing the reaction until the distillate is substantially free of isobutanol, and separating the vinyl ether formed from the remaining isobutyl vinyl ether.

References Cited
UNITED STATES PATENTS 2,579,412  12/1951  Adelman _____ 260—614
2,760,990  8/1956   Watanabe et al. _____ 260—614

BERNARD HELFIN, Primary Examiner

U.S. Cl. X.R.

260—584, 614, 615